Feb. 4, 1930.  E. C. BEDFORD  1,745,733
TENSION TRAILER HITCH
Filed April 1, 1929   2 Sheets-Sheet 1
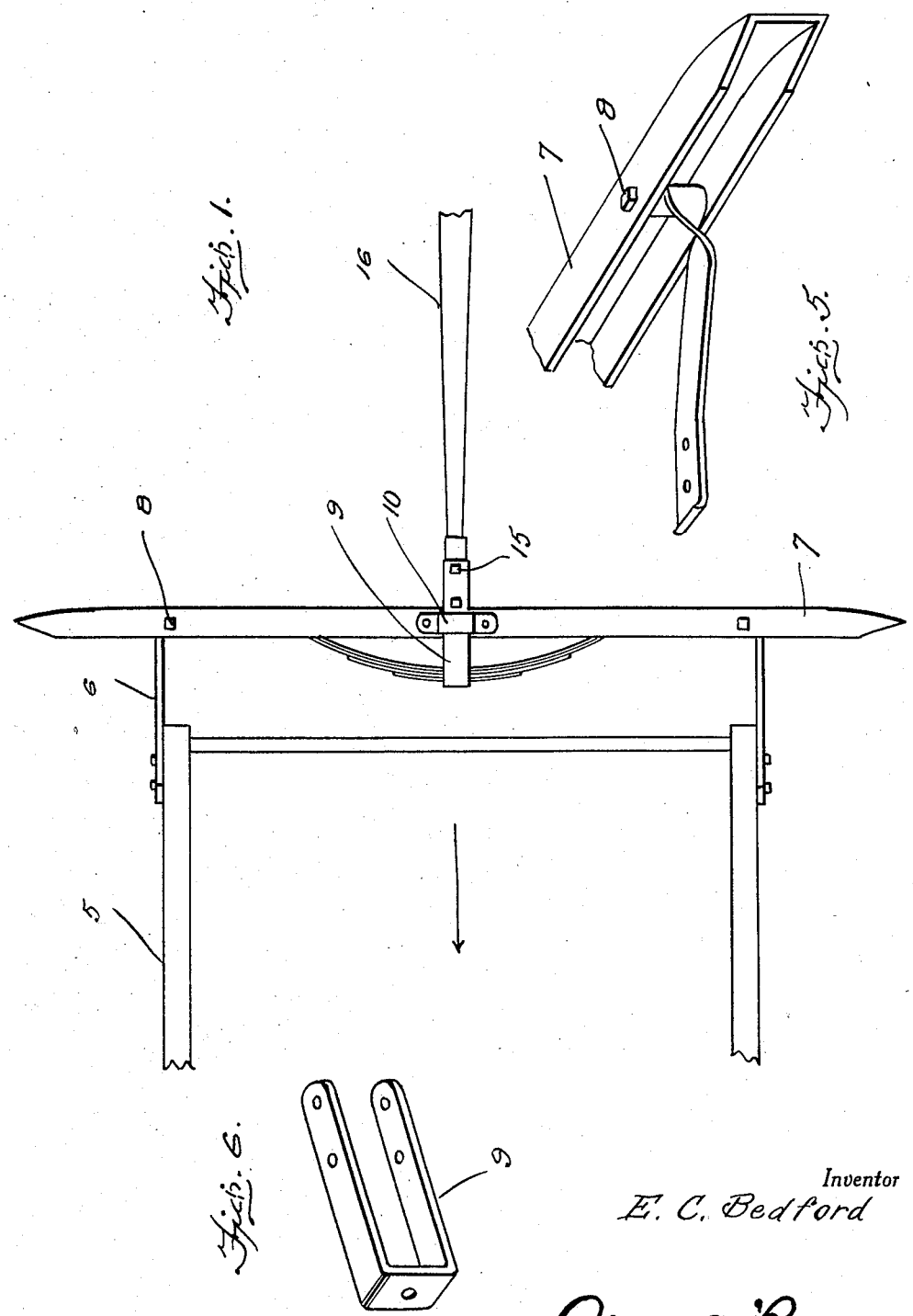
Inventor
E. C. Bedford
By Clarence A. O'Brien
Attorney Feb. 4, 1930.  E. C. BEDFORD  1,745,733
TENSION TRAILER HITCH
Filed April 1, 1929  2 Sheets-Sheet 2
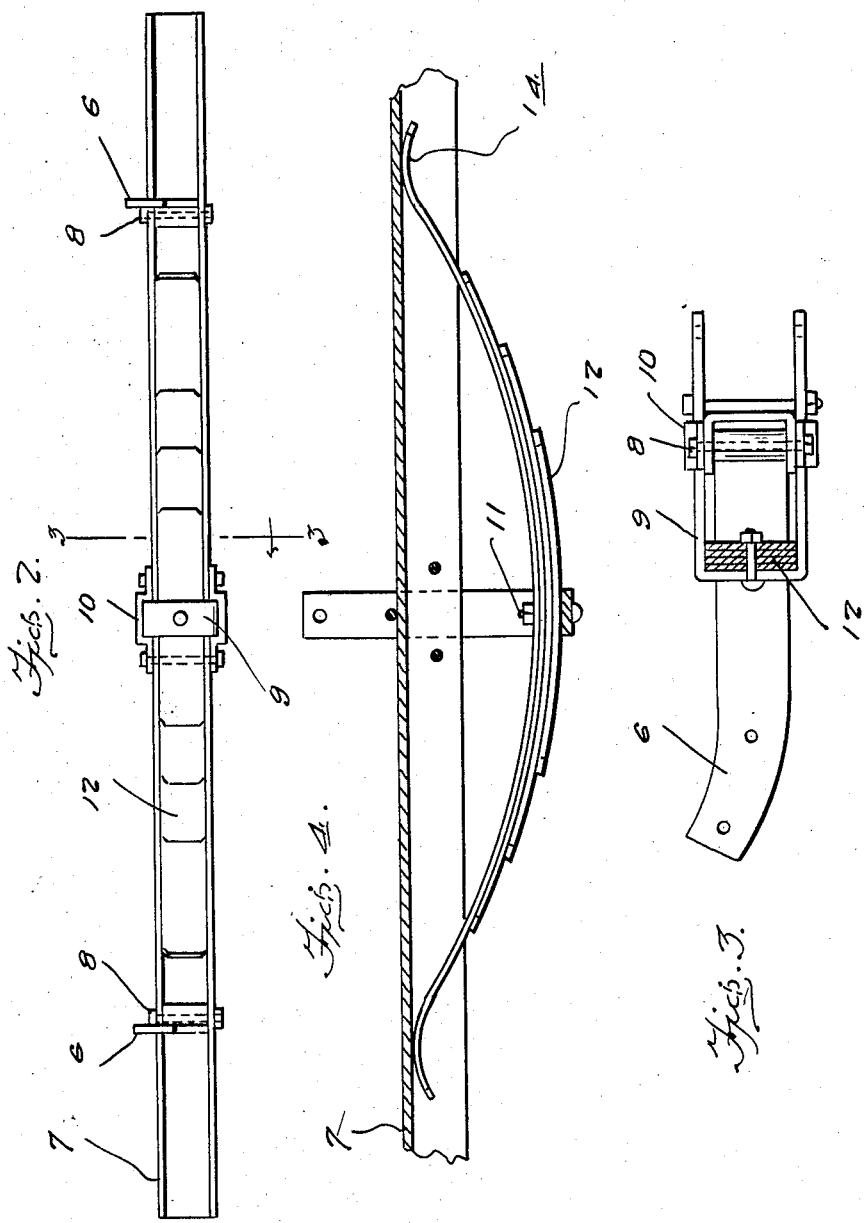
Inventor
E. C. Bedford
By Clarence A. O'Brien
Attorney Patented Feb. 4, 1930

1,745,733

UNITED STATES PATENT OFFICE

EDMUND C. BEDFORD, OF WILLOWS, CALIFORNIA

TENSION TRAILER HITCH

Application filed April 1, 1929. Serial No. 351,656.

The present invention relates to a trailer hitch and has for its prime object to provide a resilient means which takes up the shocks incident to the pulling of a trailer.

Another very important object of the present invention resides in the provision of a structure of this nature which is exceedingly simple in its formation and arrangement of parts, strong and durable, thoroughly efficient and reliable in use, and otherwise well adapted to the purpose for which it is designed.

With the above and numerous other objects in view as will appear as the description proceeds, the invention resides in certain novel features of construction and in the combination and arrangement of parts as will be hereinafter more fully described and claimed.

In the drawings:

Figure 1 is a top plan view of the hitch embodying the features of my invention.

Figure 2 is a front elevation thereof.

Figure 3 is a vertical transverse section taken substantially on the line 3—3 of Figure 2.

Figure 4 is a horizontal section therethrough.

Figure 5 is a perspective view of one end of the transverse channel iron, and

Figure 6 is a perspective view of the stirrup.

Referring to the drawings in detail, it will be seen that numerals 5 denote the sides of the frame of a towing vehicle, to which are attached straps 6, to extend rearwardly therefrom and to be anchored in the end portions of a channel cross iron 7 as is indicated at 8. This channel cross iron is located in spaced parallelism with the rear end of the towing vehicle frame. A U-shaped stirrup 9 has its legs slidable through guides 10 on the centers of the angle iron 7, one above and one below, so that the stirrup straddles the said angle iron and has its front portion disposed forwardly and anchored by a bolt as at 11 to the center of a semi-elliptical spring 12 the ends of which are curved as at 14 to slide in the channels of the channel iron. The ends of the legs of the stirrup are fastened as at 15 to a towing bar 16 adapted to be attached to the towed vehicle.

Obviously, when the towing vehicle starts up, the shock incident thereto will be absorbed by the spring 12.

It is thought that the construction, utility and advantages of this invention will now be quite apparent to those skilled in this art without a more detailed description thereof. The present embodiment of the invention has been disclosed in considerable detail, merely for the purposes of exemplification, since in actual practice, it attains the features of advantage enumerated as desirable in the statement of the invention and the above description.

It will be apparent that changes in the details of construction and in the combination and arrangement of parts may be resorted to, without departing from the spirit or scope of the invention as hereinafter claimed or sacrificing any of its advantages.

Having thus described my invention, what I claim as new is:

1. A tension tractor hitch of the class described including a channel bar, straps extending forwardly from the channel bar to be anchored to a towing vehicle, guides on the center of the channel iron, a U-shaped stirrup having its legs slidable through the guides, a semi-elliptical spring having its ends in the channel of the channel irons and a receiving bolt connecting the springs to the bight of the stirrup.

2. A tension tractor hitch of the class described including a channel bar of substantially U-shaped cross section, straps extending forwardly from the opposite portions of the channel bar to be anchored to a towing vehicle, guides on the center of the channel iron, a U-shaped stirrup having its legs slidable through the guides, a semi-elliptical spring having its ends in the channel of the channel bars and a center fixed to the bight of the stirrup.

3. A tension tractor hitch of the class described including a channel bar, straps extending forwardly from the channel bar to be anchored to a towing vehicle, inverted U-shaped guides on the upper and lower sides of the center of the channel iron, a U-shaped stirrup having its legs slidable through the guides, a semi-elliptical spring having its ends in the channel of the channel irons and the center fixed to the bight of the stirrup, and a bar anchored between the terminals of the legs of the stirrup.

In testimony whereof I affix my signature.

EDMUND C. BEDFORD.